United States Patent
Yang et al.

(10) Patent No.: US 9,112,198 B2
(45) Date of Patent: Aug. 18, 2015

(54) CLOSED LOOP TYPE FUEL CELL SYSTEM

(75) Inventors: Cheol Nam Yang, Changwon-si (KR);
Yong-Soo Jeong, Changwon-si (KR);
Chang Rae Lee, Changwon-si (KR);
Sung-Mo Moon, Changwon-si (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 327 days.

(21) Appl. No.: 13/322,556

(22) PCT Filed: Oct. 20, 2009

(86) PCT No.: PCT/KR2009/006064
§ 371 (c)(1),
(2), (4) Date: Nov. 26, 2011

(87) PCT Pub. No.: WO2010/137774
PCT Pub. Date: Dec. 2, 2010

(65) Prior Publication Data
US 2012/0070751 A1    Mar. 22, 2012

(30) Foreign Application Priority Data
May 27, 2009    (KR) .................. 10-2009-0046379

(51) Int. Cl.
*H01M 8/04* (2006.01)
*H01M 8/06* (2006.01)

(52) U.S. Cl.
CPC ...... *H01M 8/04156* (2013.01); *H01M 8/04552* (2013.01); *H01M 8/04828* (2013.01); *H01M 8/0662* (2013.01); *Y02E 60/50* (2013.01)

(58) Field of Classification Search
CPC .................................. H01M 8/04; H01M 8/06
USPC ................................................. 429/400–535
See application file for complete search history.

(56) References Cited

U.S. PATENT DOCUMENTS

| | | | | |
|---|---|---|---|---|
| 5,441,821 A | * | 8/1995 | Merritt et al. | 429/410 |
| 2005/0003244 A1 | * | 1/2005 | Pham | 429/12 |
| 2005/0031917 A1 | * | 2/2005 | Margiott et al. | 429/17 |
| 2008/0187809 A1 | * | 8/2008 | Hibbs et al. | 429/34 |

FOREIGN PATENT DOCUMENTS

JP    2008-251312    * 10/2008    ........... H01M 8/06

OTHER PUBLICATIONS

Oda et al. JP 2008-251312. Oct. 16, 2008. English machine translation by JPO.*

* cited by examiner

*Primary Examiner* — Kenneth Douyette
*Assistant Examiner* — James Lee
(74) *Attorney, Agent, or Firm* — Heidi L. Eisenhut; Loza & Loza, LLP

(57) ABSTRACT

A closed loop type fuel cell system is provided including a recirculating unit that recirculates hydrogen and oxygen discharged from a main fuel cell into the main fuel cell and a reproducing unit that removes water produced in operation of the main fuel cell and impurities contained in the circulated hydrogen and oxygen. Further, a closed loop type fuel cell is provided that makes it possible to generate electricity by using a main fuel cell and purify water and impurities by allowing a side of a recirculating unit to selectively communicate with a side of a reproducing unit. Further, a closed loop type fuel cell is provided that is precluded by being damaged by precluding reduction of efficiency of electric generation of a main fuel cell by selectively replacing a sacrifice fuel cell in a reproducing unit.

11 Claims, 2 Drawing Sheets

CLOSED LOOP TYPE FUEL CELL SYSTEM

CROSS-REFERENCE TO RELATED APPLICATIONS

This application is the U.S. national stage of International Patent Application No. PCT/KR2009/006064, filed on Oct. 20, 2009, which claims the benefit of priority from Korean Patent Application No. 10-2009-0046379, filed May 27, 2009. The disclosures of the foregoing applications are incorporated herein by reference in their entirety.

BACKGROUND OF THE INVENTION

1. Field of the Invention

The present invention relates to a closed loop type fuel cell system.

2. Description of the Related Art

Fuel cells are systems that generate electricity, using reaction between fuel (LNG, LGP, hydrogen, and methanol) and oxygen, and produces water and heat as byproducts, and which are electric generation devices having high electric generation efficiency without factors polluting the environment.

The fuel cells are classified into a polymer electrolyte membrane fuel cell (PEMFC), a direct methanol fuel cell (DMFC), a phosphoric acid fuel cell (PAFC), a molten carbonate fuel cell (MCFC), a solid oxide fuel cell (SOFC), and the like, in accordance with the types of electrolytes.

The PEMFC, PAFC, and DMFC in the fuel cells has low operation temperatures of 80 to 120° C., 190 to 200° C., and 25 to 90° C., respectively, and useful for the power sources of transport, such as vehicles, home, and portable devices.

Therefore, researches of reducing the size, weight, and cost of the entire fuel cell systems have been conducted to advance and increase common use of the fuel cells.

However, a large amount of byproducts are produced in an operation environment at a high-current region in the fuel cells and supply of gas to the catalytic layer and dispersion of protons to the polymer film are prevented by droplets of excessive water, such that the performance of the fuel cells is deteriorated.

It is more serious that it is difficult to implement normal operation by reduction of performance of some cells due to non-uniform distribution of water in unit cells disposed in the fuel cells.

As described above, the excessive water produced in the fuel cells, that is, flooding is an important factor that makes normal operation of the fuel cells difficult, in addition to reducing reaction efficiency, it is necessary to discharge the excessive water outside the fuel cells.

Accordingly, "a method and device for performing internal purge infuel cell system" is disclosed in Korean Patent No. 0509818.

The related art is briefly described. Voltages of a plurality of cells are sensed, water and gas mixture in a stack is purged outside the stack by using a pressure difference, by controlling a purge valve and a recirculation pump when flooding occurs, and the gas separated from the water can be re-supplied to the stack.

However, the related art described above has the following problems.

That is, since the degree of purity of the fuel supplied to the fuel cell cannot be 100%, impurities collect in the fuel cell even if the gas separated from the water is re-supplied to the fuel cell, such that electric generation efficiency is reduced.

Further, when carbon of the separator and electrodes in the fuel cell and impurities, such as metal ions and particles of the peripheral components of the fuel cell collect, durability of the fuel cell is gradually influenced and current leaks in the cell, which reduces the life span or damages the fuel cell causes a large amount of repairing charges, and this is not preferable.

Further, even if the water produced in the fuel cell is removed by recirculating the gas in the fuel cell by using the related art, the impurities flow back into the fuel cell by the gas supplied to the fuel cell, because it is a closed circuit, such that performance and durability of the fuel cell are reduced.

SUMMARY OF THE INVENTION

The present invention has been made in an effort to provide a closed loop type fuel cell system including a recirculating unit that recirculates hydrogen and oxygen discharged from a main fuel cell into the main fuel cell and a reproducing unit that removes water produced in operation of the main fuel cell and impurities contained in the circulated hydrogen and oxygen.

Further, the present invention provides a closed loop type fuel cell that makes it possible to generate electricity by using a main fuel cell and purify water and impurities by allowing a side of a recirculating unit to selectively communicate with a side of a reproducing unit.

Further, the present invention provides a closed loop type fuel cell that is precluded by being damaged by precluding reduction of efficiency of electric generation of a mina fuel cell by selectively replacing a sacrifice fuel cell in a reproducing unit.

A closed loop type fuel cell system according to an exemplary embodiment of the present invention includes: a main fuel cell that generates electricity by receiving fuel and oxygen; a supply unit that supplies gas containing fuel and oxygen to the main fuel cell; a recirculating unit that recirculates the gas containing hydrogen and oxygen discharged from the main fuel cell; a sensing unit that senses the voltages of a plurality of cells in the main fuel cell; a reproducing unit that selectively communicates with a side of the main fuel cell and removes water and impurities in the main fuel cell; and a control unit that controls the operations of the supply unit, the recirculating unit, the sensing unit, and the reproducing unit, in which the reproducing unit includes: a reproducing pipe that guides the flow direction of the gas containing hydrogen and oxygen passing through the recirculating unit; a reproducing valve that selectively blocks the reproducing pipe; a sacrifice fuel cell that produces water by reacting the gas containing hydrogen and oxygen supplied from the reproducing pipe with air; and a collecting unit that collects water produced in the sacrifice fuel cell.

The recirculating unit includes: a gas-liquid separator that separates water and reacting gas produced in the main fuel cell into water and gas; a recirculating pipe that guides the gas separated from the water by the gas-liquid separator to the main fuel cell; and a recirculating pump that forces the flow of the gas in the recirculating pipe.

The reproducing pipe and the recirculating pipe communicate with each other.

The water collecting unit and the gas-liquid separator selectively communicate with a water tank storing water.

The sacrifice fuel cell generates electricity by receiving hydrogen and hydrogen and a pair of electrodes that guide current flow are selectively grounded.

The sacrifice fuel cell has capacity of electric generation smaller than the main fuel cell and is selective replaced.

A switch that selectively connects/disconnects a pair of electrodes is disposed at a side of the sacrifice fuel cell and the switch is grounded when the reproducing valve is closed and then opened after a predetermined time passes.

The supply unit includes a fuel tank that stores and selectively supplies hydrogen and an oxygen tank that stores and selectively supplies oxygen.

A check valve that blocks the hydrogen discharged from the fuel tank in order not to flow into the recirculating pipe is disposed at a side of the recirculating pipe.

The control unit opens the reproducing pipe, when one or more of the voltages of the plurality of cells are lower than a predetermined voltage.

A drain that controls a water level by selectively discharge the water stored in the gas-liquid separator is disposed at a side of the gas-liquid separator.

The main fuel cell, the supply unit, the recirculating unit, the sensing unit, the reproducing unit, and the control unit are positioned in a closed space.

According to the present invention, the recirculating unit that recirculates the hydrogen and oxygen discharged from the main fuel cell to the main fuel cell and the reproducing unit that removes the water and impurities in the main fuel cell when the efficiency of electric generation of the main fuel cell are provided.

Therefore, it is possible to maximize the fuel efficiency and maximize the efficiency of electric generation of the main fuel cell, using the operation of the reproducing unit, when the fuel cell system is disposed in a closed space, such as a submarine.

Further, the sacrifice fuel cell in the reproducing unit can be selectively displaced in the present invention.

Therefore, it is possible to selectively increase the efficiency of electric generation by selectively reproducing the main fuel cell when the efficiency of electric generation of the main fuel cell is reduced, such that it is possible to improve the durability of the main fuel cell.

In addition, it is easy to maintain the main fuel cell by making the sacrifice fuel cell selectively replaceable.

DETAILED DESCRIPTION OF THE PREFERRED EMBODIMENTS

The configuration of a closed loop type fuel cell system according to an exemplary embodiment of the present invention is described with reference to the accompanying drawings.

Figure 1:
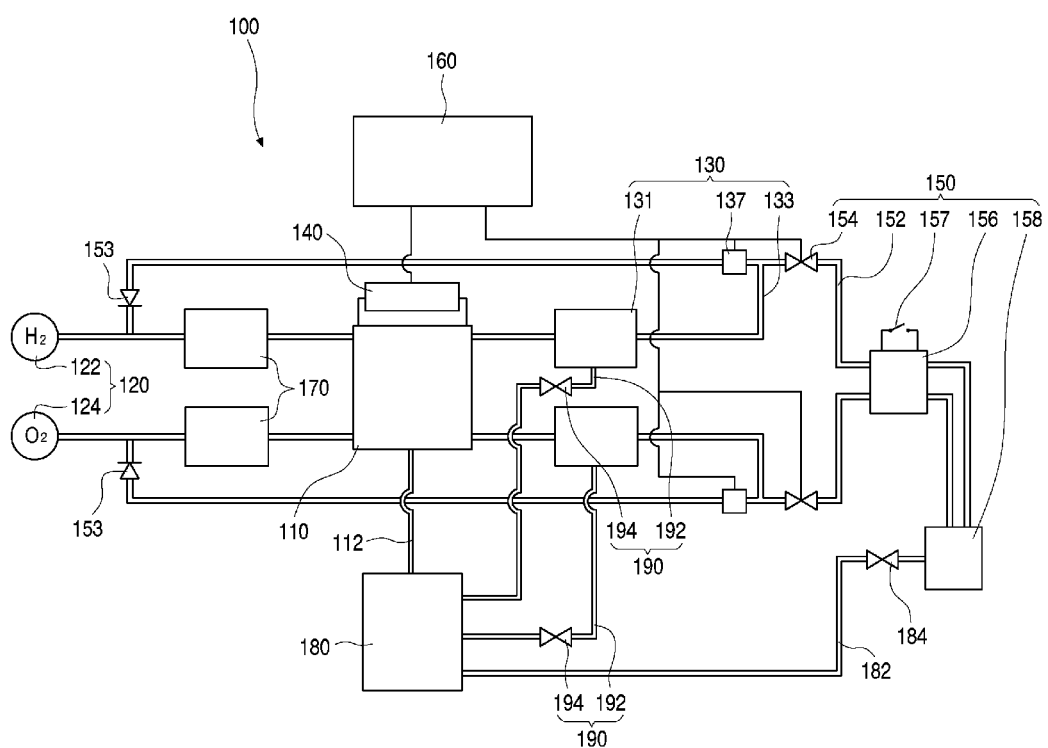
FIG. 1 is a view showing the configuration of a closed loop type fuel cell system according to an exemplary embodiment of the present invention.

FIG. 1 is a view showing the configuration of a closed loop type fuel cell system according to an exemplary embodiment of the present invention.

As shown in the figure, a closed loop type fuel cell system 100 generates electricity by receiving and reacting hydrogen $H_2$ that is fuel and oxygen $O_2$ and includes a main fuel cell 110, a supply unit 120 that supplies gas containing fuel and oxygen to the main fuel cell 110, a recirculating unit 130 that recirculates the gas containing hydrogen and oxygen discharged from the main fuel cell 110, a sensing unit that senses the voltages of a plurality of cells in the main fuel cell 110, a reproducing unit 150 that selectively communicates with a side of the main fuel cell 110 and removes water and impurities in the main fuel cell 110, and a control unit 160 that controls the operations of the supply unit 120, the recirculating unit 130, the sensing unit 140, and the reproducing unit 150.

The closed loop type fuel cell system 100 is a system 110 that can be used for an apparatus having a closed space, such as a minisub, a submarine, and a space ship, in which the main fuel cell 110, the supply unit 120, the recirculating unit 130, the sensing unit 140, the reproducing unit 150, and the control unit 160 are disposed and operable in a closed space.

In more detail, various fuel cells may be selectively used as the main fuel cell 110 as long as it is possible to receive fuel and air containing oxygen and generate electricity, and receives gas containing hydrogen and oxygen from the supply unit 120.

The supply unit 120 is provided to supply a gas containing hydrogen and oxygen to the main fuel cell 110 and includes a fuel tank 122 that stores and selectively supplies hydrogen and an oxygen tank 124 that stores oxygen and selectively supplies the oxygen in an exemplary embodiment of the present invention.

The fuel tank 122 and the oxygen tank 124 communicate with a humidifier 170 and the humidifier 170 communicates with the main fuel cell 110. Therefore, the hydrogen and oxygen in the fuel tank 122 and the oxygen tank 124 are supplied into the main fuel cell 110 after being humidified through the humidifier 170.

The humidifier 170 is provided such that the fuel and air supplied in the main fuel cell 110 can react well and the detail description is not provided.

The sensing unit 140 is disposed above the main fuel cell 110. The sensing unit 140 is disposed to sense voltages of a plurality of cells in the main fuel cell 110.

That is, the main fuel cell 110 generates high voltage by stacking a plurality of cells, and as the cells are used for a long period of time, different voltages are generated by differences in current flux and the amount of water generated in the cells, such that differences are generated among the cells.

Therefore, the sensing unit 140 is provided too measure and diagnoses in advance differences in current flux and the amount of water even while the main fuel cell operates.

The recirculating unit 130 is disposed at the right side of the sensing unit 140. The recirculating unit 130 is provided to maximize coefficient of utilization of the fuel by recirculating the hydrogen and oxygen discharged without reacting in the main fuel cell 110 to the main fuel cell 110.

For this configuration, the recirculating unit 130 includes a gas-liquid separator 131 that separates water, which is produced in reaction of oxygen and hydrogen, and non-reacting gas in the main fuel cell 110, a recirculating pipe 133 that guides the gas separated from the water in the gas-liquid separator 131 to the main fuel cell 110, and a recirculating pump 137 that forces the flow of gas in the recirculating pipe 133.

Further, the recirculating unit 130 is provided for the humidifiers 170 that communicate with the fuel tank 122 and the oxygen tank 124, respectively.

That is, the recirculating units 130 are connected to the right upper portion and the right lower portion of the main fuel cell 110, respectively, the recirculating unit 130 connected to the right upper portion of the main fuel cell 110 recirculates hydrogen to the front of the humidifier 170 and the recirculating unit 130 connected to the right lower portion of the main fuel cell 110 recirculates oxygen to the front of the humidifier 170.

Therefore, the gas (hydrogen or oxygen) separated from the water by the gas-liquid separator 131 can be recirculated through the recirculating pipe 133.

A check valve 153 is disposed at a side of the recirculating pipe 133. The check valve 153 blocks the hydrogen supplied from the fuel tank 122 such that the hydrogen cannot flow into the recirculating pipe 133, and forces the recirculating gas (hydrogen and oxygen) supplied to the front end of the main fuel cell 110 by the recirculating pump 137 to flow into the humidifier 170.

Further, a drain 190 is disposed at the lower portion of the gas-liquid separator 131. The drain 190 guides water into a water tank 180, when water discharged from the main fuel cell 110 increases above an appropriate level in the gas-liquid separator 131.

For this configuration, the drain 190 includes a drain pipe 192 making the gas-liquid separator 131 communicate with the water tank 180 and a drain valve 194 selectively closes the drain pipe 192.

Therefore, as the drain valve 194 is closed and opened, the water in the gas-liquid separator 131 flows into the water tank 180 through the drain pipe 192, such that the water level in the gas-liquid separator 131 can be kept constant.

The reproducing unit 150 that is a main component of the present invention is disposed at the right side of the recirculating unit 130. The reproducing unit 150 allows the impurities in the main fuel cell 110 to be discharged to the outside by temporarily changing the flow of gas flowing in the recirculating pipe 133, when the voltages of the cells in the main fuel cell 110 which are sensed by the sensing unit 140 are lower than a predetermined voltage.

For this configuration, the reproducing unit 150 includes a reproducing pipe 152 that guides the flow direction of the gas containing hydrogen and oxygen passing through the recirculating unit 130, a reproducing valve 154 that selectively blocks the reproducing pipe 152, a sacrifice fuel cell 156 that produces water by reacting the gas containing hydrogen and oxygen supplied from the reproducing pipe 152 with air, and a collecting unit 158 that collects water produced in the sacrifice fuel cell 156.

The reproducing pipe 152 diverging from a side of the recirculating pipe 133 and communicates with the sacrifice fuel cell 156, and guides the flow of gas by the operation of the reproducing valve 154.

Therefore, the sacrifice fuel cell 156 can receive hydrogen and oxygen when the reproducing valve 154 is open.

The sacrifice fuel cell 156 selectively operate when the performance is deteriorated by the water in the main fuel cell 110 or in order to discharge impurities, as can be seen from the name, and has capacity of electric generation smaller than the main fuel cell 110 and can be selectively replaced.

That is, the sacrifice fuel cell 156 generates electricity by receiving hydrogen and oxygen and has a switch 157 at a side of a pair of electrodes guiding the flow of current to be selective connected. Further, the gas discharged from the main fuel cell 110 is consumed in the sacrifice fuel cell 156 by the connection of the switch 157 into water while the other impurities collect in the sacrifice fuel cell 156.

Further, the supplied non-reacting gas is changed into water while the impurities are absorbed and accumulated, by electric connection in the sacrifice fuel cell 156. Therefore, the sacrifice fuel cell 156 collects a small amount of impurities in the reacting gas supplied to increase durability of the main fuel cell 110 and the impurities in a close type fuel cell system.

Accordingly, the sacrifice fuel cell 156 is exposed to a severe environment even though protecting the main fuel cell 110 and increasing the durability, such that it may be periodically replaced.

Meanwhile, the operations of the sensing unit 140, recirculating pump 137, reproducing valve 154, and switch 157 are controlled by the control unit 160.

That is, the control unit 160 operates the reproducing unit 150, when one or more of the voltages of the cells are lower than a predetermined voltage, and operates the recirculating unit 130 when it is a normal voltage.

In more detail, the control unit operates the recirculating unit 130, with the recirculating pump 137 operating and the switch 157 turned off.

On the contrary, the reproducing unit 150 is operated, with the recirculating pump 137 keeping stable, the reproducing valve 154 open after the reproducing pipe 152 is closed for a predetermined time, and the switch 157 turned on.

Alternatively, the control unit 160 adjusts the water level by selectively opening the drain valve 194 in accordance with the water level in the gas-liquid separator 131.

As described above, the gas-liquid separator 131 selectively communicates with the water tank 180 by the drain pipe 192 while the main fuel cell 110 communicates with the water tank 180 by a drain channel 112 disposed at a side of the main fuel cell 110.

Further, the water collecting unit 158 also communicates with the water tank 180. That is, a water level control pipe 182 and a control valve 184 that control the water level in the water collecting unit 158 are disposed at the left side of the water collecting unit 158.

The water level control pipe 182 communicates with the water collecting unit 158 and the water tank 180 at both ends and the control valve 184 selectively close the water level control pipe 182.

Therefore, the water in the water collecting unit 158 flows into the water tank 180 and is stored therein, in accordance with whether the control valve 184 is open.

Accordingly, all the water in the main fuel cell 110, the water in the gas-liquid separator 131, and the water in the water collecting unit 158 flow into the water tank 180 and are stored therein.

Figure 2:
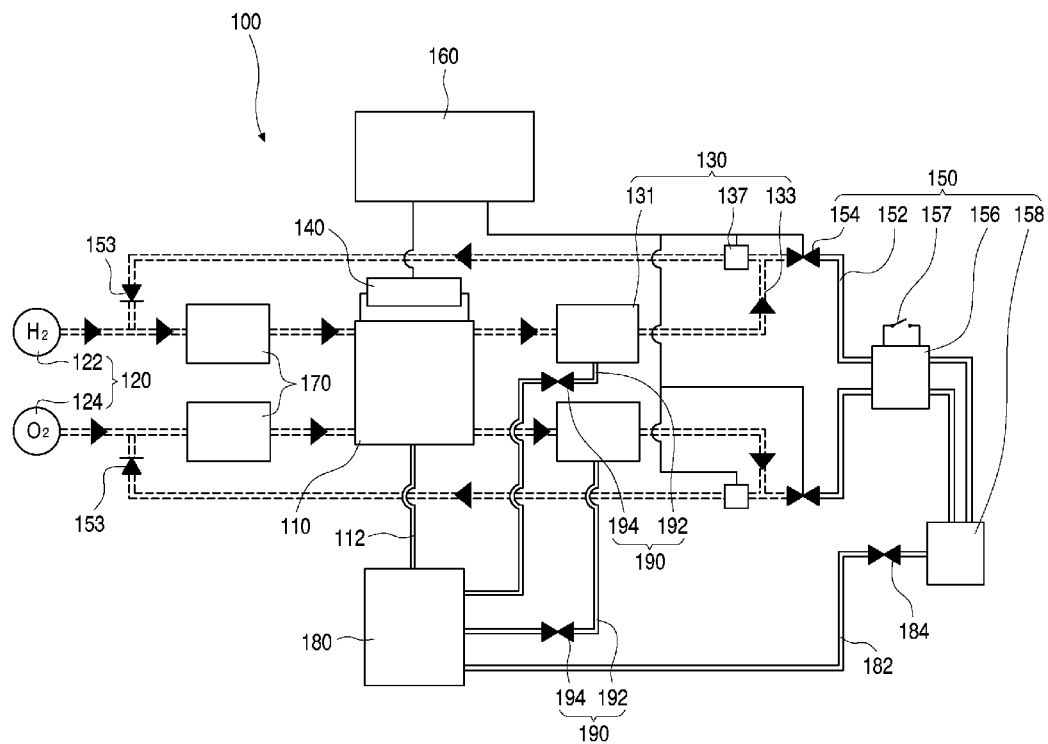
FIG. 2 is a view showing the flow of fuel and hydrogen when a recirculating unit that is a component of the closed loop type fuel cell system according to an exemplary embodiment of the present invention operates.

The process of generating electricity by operating the closed loop type fuel cell system 100 is described hereafter with reference to the arrows in FIG. 2.

FIG. 2 is a view showing the flow of fuel and hydrogen when the recirculating unit 130 that is a component of the closed loop type fuel cell system according to an exemplary embodiment of the present invention operates.

As shown in the figure, the supply unit 120 supplies hydrogen and oxygen into the humidifier 170 to allow the closed loop type fuel cell system 100 to generate electricity. The main fuel cell 110 receives the hydrogen and oxygen humidified through the humidifier 170 and generates electricity.

Further, since the recirculating pipe 133 can guide the flow of gas when being open, the oxygen and hydrogen discharged without reacting in the main fuel cell 110 are separated from the water by the gas-liquid separator 131 and recirculated to the front of the humidifier 170.

In this operation, the reproducing valve 154 closes the reproducing pipe 152 to block gas and the sensing unit 140 continuously measures the voltages of the cells in the main fuel cell 110. Further, the switch 157 is turned off.

Therefore, the reuse ratio of the hydrogen and oxygen can be maximized by the operation of the recirculating unit 130.

Figure 3:
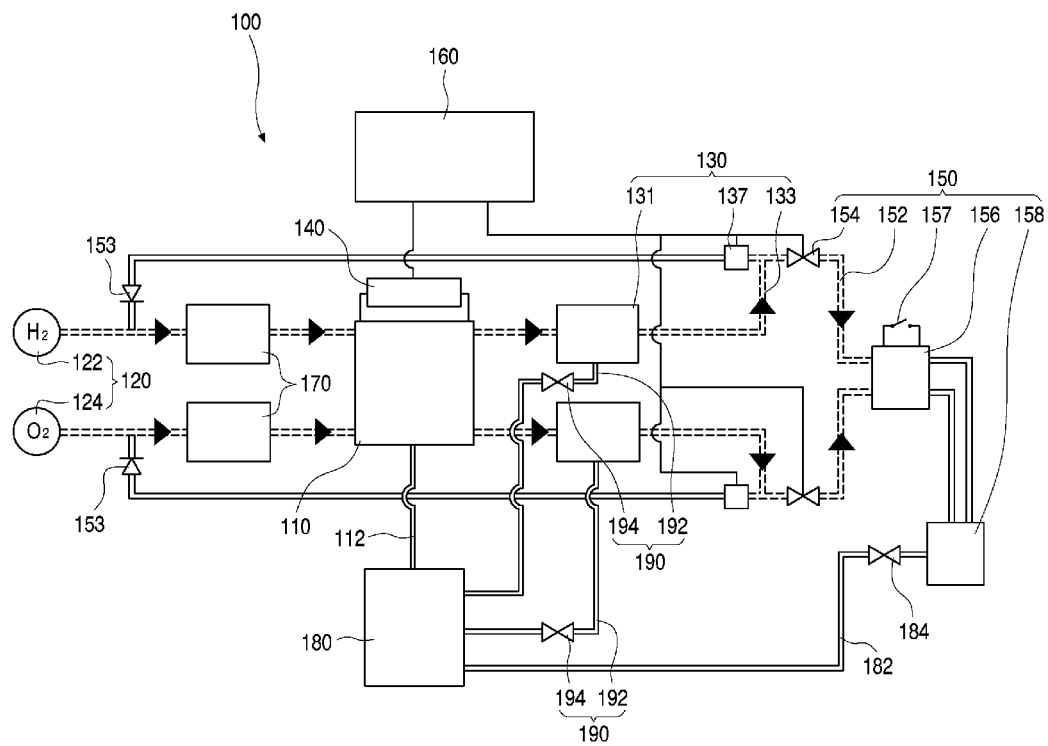
FIG. 3 is a view showing the flow of fuel and hydrogen when a reproducing unit that is a component of the closed loop type fuel cell system according to an exemplary embodiment of the present invention operates.

The flow of gas when one or more of the voltages of the cells which are sensed by the sensing unit 140 are lower than a predetermined voltage and the reproducing unit 150 is operated is described hereafter with reference to FIG. 3.

FIG. 3 is a view showing the flow of fuel and hydrogen when the reproducing unit 150 that is a component of the closed loop type fuel cell system according to an exemplary embodiment of the present invention operates.

As shown in the figure, as the efficiency of electric generation of the main fuel cell 110 decreases, the reproducing unit 150 operates and the efficiency of electric generation and durability of the main fuel cell 110 can be increased.

For this configuration, the control unit 160 closes the reproducing valve 154 and the switch 157 is turned on. Further, the recirculating pump 137 is controlled to stop the operation.

Further, when hydrogen and oxygen are supplied from the fuel tank 122 and the oxygen tank 124, high pressure is generated because the reproducing valve 154 keeps closed.

Thereafter, as a predetermined time passes, the closed reproducing valve 154 is opened and the impurities in the main fuel cell 110 are instantaneously discharged with the hydrogen and oxygen.

The impurities and gas discharged from the main fuel cell 110 are separated through the gas-liquid separator 131 and the gas rapidly moves to the reproducing pipe 152 and flows into the sacrifice fuel cell 156.

That is, since the recirculating pump 137 has stopped the operation and the internal pressure of the recirculating pipe 133 at the left side of the recirculating pipe 133 (recirculating pump 137) is higher than the internal pressure of the reproducing pipe 152, gas cannot flow inside.

Therefore, the sacrifice fuel cell 156 generates electricity the generated electricity flows to the ground because the switch 157 is turned on, such that the sacrifice fuel cell 156 produces water therein.

The water produced in the sacrifice fuel cell 156 flows into the water collecting unit 158 and is stored therein, and can flow into the water tank 180 by the control valve 184 that is selectively opened.

The water and impurities in the main fuel cell 110 are accumulated in the sacrifice fuel cell 156 by the operation described above, such that the impurities in the main fuel cell 110 are reduced, the durability can be correspondingly increased, and the main fuel cell 110 can be reproduced.

The present invention is not limited to the embodiment described above and may be modified in various ways by those skilled in the art on the basis of the present invention without departing from the spirit of the present invention.

For example, although the internal configuration of the main fuel cell is not disclosed in detail in the exemplary embodiment of the present invention, it is apparent to further provide a cooling water channel for increasing the efficiency of electric generation by reducing the amount of heat generated from the main fuel cell.

What is claimed is:

1. A closed loop type fuel cell system comprising:
    a main fuel cell for generating electricity, the main fuel cell having a input and an output;
    a fuel supply unit fluidly connected to the input of the main fuel cell for supplying gas containing fuel to the main fuel cell;
    an oxygen supply unit fluidly connected to the input of the main fuel cell for supplying oxygen containing fuel to the main fuel cell;
    a first recirculating unit, fluidly connected to the output of the main fuel cell, that recirculates the gas discharged from the main fuel cell and includes a first gas-liquid separator that separates water and unreacted hydrogen from the main fuel cell into water and hydrogen, a first recirculating pipe that directs the hydrogen separated from the water to the main fuel cell and a first recirculating pump that forces the flow of gas in first the recirculating pipe;
    a second recirculating unit, fluidly connected to the output of the main fuel cell, that recirculates the oxygen discharged from the main fuel cell and includes a second gas-liquid separator that separates water and unreacted oxygen from the main fuel cell into water and oxygen, a second recirculating pipe that directs the oxygen separated from the water to the main fuel cell and a second recirculating pump that forces the flow of gas in the second recirculating pipe;
    a sensing unit, in communication with the main fuel cell, that senses the voltages of a plurality of cells in the main fuel cell;
    a reproducing unit, fluidly connected between the output of the main fuel cell and the first and second recirculating units, the reproducing unit comprises:
    a first reproducing valve, fluidly connected between the output of the main fuel cell and the first recirculating unit, that selectively communicates with the output of the main fuel cell and removes water and impurities in the main fuel cell;
    a second reproducing valve, fluidly connected between the output of the main fuel cell and the second recirculating unit, that selectively communicates with the output of the main fuel cell and removes water and impurities in the main fuel cell; and
    a sacrifice fuel cell, fluidly connected to the reproducing unit, that produces water by reacting a gas containing hydrogen and oxygen supplied from the reproducing unit with air;
    a collecting unit that collects water produced in the sacrifice fuel cell; and
    a control unit that controls the operations of the fuel supply unit, the oxygen supply unit, the first recirculating unit, the second recirculating unit, the sensing unit, and the reproducing unit.

2. The closed loop type fuel cell system according to claim 1, wherein the first and second reproducing valves and the first and second recirculating pipes communicate with each other.

3. The closed loop type fuel cell system according to claim 1, wherein the water collecting unit and the first and second gas-liquid separators selectively communicate with a water tank storing water.

4. The closed loop type fuel cell system according to claim 1, wherein the sacrifice fuel cell generates electricity by receiving hydrogen and oxygen and a pair of electrodes that guide current flow are selectively grounded.

5. The closed loop type fuel cell system according to claim 4, wherein the sacrifice fuel cell has capacity of electric generation smaller than the main fuel cell and is selectively replaced.

6. The closed loop type fuel cell system according to claim 4, wherein a switch, that selectively connects/disconnects the pair of electrodes, is connected to the sacrifice fuel cell and the switch is grounded when the reproducing unit is closed and then opened after a predetermined time passes.

7. The closed loop type fuel cell system according to claim 1, wherein the fuel supply unit includes a fuel tank that stores and selectively supplies hydrogen and wherein the oxygen supply unit includes an oxygen tank that stores and selectively supplies oxygen.

8. The closed loop type fuel cell system according to claim 7, wherein a check valve that blocks the hydrogen discharged from the fuel tank in order not to flow into each of the first and second recirculating pipes is disposed at a side of the each of the first and second recirculating pipes.

9. The closed loop type fuel cell system according to claim 2, wherein the control unit opens each of the first and second reproducing valves of the reproducing unit, when one or more of the voltages of the plurality of cells are lower than a predetermined voltage.

10. The closed loop type fuel cell system according to claim 1, further comprising a drain valve that controls a water level by selectively discharging the water stored in the first and second gas-liquid separators disposed at a side of the first and second gas-liquid separators.

11. The closed loop type fuel cell system according to claim 1 or 8, wherein the main fuel cell, the fuel supply unit, the oxygen supply unit, the first recirculating unit, the second recirculating unit, the sensing unit, the reproducing unit, and the control unit are positioned in a closed space.

* * * * *